United States Patent [19]

Fisk

[11] Patent Number: 4,477,603

[45] Date of Patent: Oct. 16, 1984

[54] STABLE DISPERSIONS OF POLYMERS IN POLYFUNCTIONAL ACTIVE HYDROGEN COMPOUNDS AND POLYURETHANES BASED THEREON

[75] Inventor: Thomas E. Fisk, Midland, Mich.

[73] Assignee: The Dow Chemical Company, Midland, Mich.

[21] Appl. No.: 560,039

[22] Filed: Dec. 9, 1983

Related U.S. Application Data

[63] Continuation-in-part of Ser. No. 467,410, Feb. 17, 1983, abandoned.

[51] Int. Cl.$^3$ .................... C08G 18/14; C08G 18/63; C08L 75/00
[52] U.S. Cl. .................... 521/137; 252/182; 528/75; 521/127; 521/128; 521/120; 521/114
[58] Field of Search .................... 252/182; 521/137; 528/75

[56] References Cited

U.S. PATENT DOCUMENTS

| | | | |
|---|---|---|---|
| 3,304,273 | 2/1967 | Stamberger | 260/2.5 |
| 3,383,351 | 5/1968 | Stamberger | 260/33.2 |
| 3,823,201 | 7/1974 | Pizzini et al. | 260/861 |
| 3,928,299 | 12/1975 | Rosenkrantz et al. | 260/89.5 N |
| 3,968,089 | 7/1976 | Cuscurida et al. | 260/859 R |
| 4,014,846 | 3/1977 | Ramlon et al. | 260/33.2 R |
| 4,041,105 | 8/1977 | O'Shea et al. | 260/859 R |
| 4,181,781 | 1/1980 | Chandalia et al. | 521/137 |
| 4,233,425 | 11/1980 | Tefertiller et al. | 525/455 |
| 4,287,323 | 9/1981 | Tefertiller et al. | 525/404 |
| 4,332,716 | 6/1982 | Shah | 521/137 |

*Primary Examiner*—Herbert S. Cockeram

[57] ABSTRACT

A stable copolymer dispersion is prepared by addition copolymerization of (1) a monomeric adduct of an active hydrogen compound, e.g., a polyether polyol or polyether monool, and an ethylenically unsaturated haloformate compound such as acryloxyethylchloroformate with (2) ethylenically unsaturated monomer(s), e.g., styrene or a mixture thereof with acrylonitrile, while (1) and (2) are dispersed or dissolved in an excess of an active hydrogen polyfunctional compound such as a polyether polyol. The molar ratio of haloformate moiety to active hydrogen compound is preferably less than about 0.1:1. The resulting dispersion has a controlled particle size and a viscosity such that it is suitably employed in the production of polyurethane foams.

18 Claims, No Drawings

STABLE DISPERSIONS OF POLYMERS IN POLYFUNCTIONAL ACTIVE HYDROGEN COMPOUNDS AND POLYURETHANES BASED THEREON

REFERENCE TO RELATED APPLICATION

This application is a continuation-in-part of copending U.S. patent application Ser. No. 467,410, filed Feb. 17, 1983, now abandoned.

BACKGROUND OF THE INVENTION

The present invention relates to copolymer dispersions having excellent particle size distribution and to polyurethanes prepared by reacting these dispersions with reactive polyisocyanates.

Polyurethanes constitute a broad class of polymeric materials having a wide range of physical characteristics. The polymers are produced by the reaction of a polyisocyanate with a polyfunctional compound having an active hydrogen in its structure. This active hydrogen compound is generally a liquid or solid capable of being melted at relatively low temperatures. Most commonly, the active hydrogen compound contains hydroxyl groups as the moieties having the active hydrogen and thus are termed polyols, e.g., the polyols of polyesters, polyester amides, or polyethers, or mixtures of two or more such materials. For reasons of commercial availability and cost, the polyols most commonly employed in the preparation of polyurethanes are the polyethers having hydroxyl terminated chains and hydroxyl terminated polyesters.

Although a wide variety of physical and chemical properties are obtainable by the proper selection of a polyisocyanate and the polyol as well as the conditions under which the polyurethane reaction is carried out, the resulting polyurethane often exhibits properties such as load bearing and processability, particularly foam applications, unacceptable for some applications.

To improve such properties, it has been the practice of the art to employ graft copolymer dispersions (often called polymer polyols) prepared from vinyl monomers and polyols in the preparation of polyurethanes as shown in U.S. Pat. Nos. 3,383,351; 3,304,273; 3,523,093; 3,652,639 and 3,823,201. In 3,304,273, a mixture of styrene and a polar monomer are copolymerized while dispersed in a polyol which is essentially free of ethylenic unsaturation. Unfortunately, stable dispersions cannot be prepared by this technique if high proportions of styrene monomer are employed. Subsequently, in order to overcome this problem, it was found desirable to employ polyols which contain a significant amount of ethylenic unsaturation. As shown in U.S. Pat. No. 3,823,201, such unsaturation was advantageously introduced by reacting the polyol with an organic compound having both ethylenic unsaturation and hydroxyl, carboxyl or epoxy moieties which are reactive with the active hydrogen moiety of the polyol. While these more improved graft copolymer dispersions solve many of the problems confronting the polyurethane art, more efficient control of particle size of the disperse phase is desired for many applications.

Accordingly, it is highly desirable to provide an improved, low viscosity copolymer dispersion wherein less unsaturated moiety is required in the polyahl in order to achieve the desired particle size and particle size distribution in the dispersion.

SUMMARY OF THE INVENTION

In one aspect, the present invention is a stable improved copolymer dispersion which comprises:
(A) a polyahl having dispersed therein;
(B) an addition copolymerizate of (1) a monomeric adduct of (a) an active ethylenically unsaturated haloformate monomer (hereinafter called "haloformate monomer") or an active ethylenically unsaturated haloformylthiolate monomer (hereinafter called "haloformylthiolate monomer") and (b) a monoahl or a polyahl with (2) at least one other ethylenically unsaturated monomer (hereinafter called "other monomer"); or
(C) a polymeric adduct of (1) an addition copolymer of a haloformate or haloformylthiolate monomer with at least one other ethylenically unsaturated monomer and (2) a monoahl or polyahl; or
(D) a mixture of (B) and (C); or
(E) a mixture of (B) and/or (C) and a polymer of at least one other ethylenically unsaturated monomer.

Preferably, the mole ratio of polymerized haloformate or haloformylthiolate monomer to monoahl or polyahl is at least about 0.001:1 and is less than an amount at which gelation occurs. For the purposes of this invention, a "monoahl" is a polyfunctional compound wherein one of the functional groups is an active hydrogen moiety capable of reacting with an isocyanate moiety to form a urethane or similar moiety. For the purposes of this invention, a "polyahl" is a polyfunctional compound wherein at least two of the functional groups are active hydrogen moieties capable of reacting with an isocyanate moiety to form a urethane or similar moiety. In addition, the term "dispersed" or "dispersion" as used herein are generic to include dispersions wherein the disperse phase constitutes colloidal size particles as well as true solutions wherein the disperse phase is at the molecular level.

Surprisingly, the copolymer dispersions of the present invention exhibit excellent stability even at relatively low molar ratios of ethylenically unsaturated moieties to polyahl. Even more surprising is the excellent control over particle size and particle size distribution achieved in said dispersions.

This invention, in another aspect, is a method for making the aforementioned copolymer dispersion. In yet another aspect, this invention is a polyurethane composition, preferably in the form of a foam, prepared from the copolymer dispersion as well as a method for reacting the copolymer dispersion with polyisocyanate to form polyurethane foams and other polyurethane compositions.

The copolymer dispersions of the present invention are usefully employed in the production of a wide variety of polyurethane products including cellular polyurethanes, polyurethane films and coatings as well as cast or molded articles of such polyurethanes. As used herein, the term "polyurethane" is to be broadly construed to include the polymeric reaction products of isocyanates with polyahls as hereinbefore defined.

DETAILED DESCRIPTION OF REPRESENTATIVE EMBODIMENTS

The polyahl suitably employed in the practice of this invention includes any organic compound having at least two active hydrogen moieties wherein the compound has a number average molecular weight ($M_n$) of at least about 60. Preferably, the polyahl is a polymer having an $M_n$ of at least 200 and at least three repeating units of a monomeric moiety. For the purposes of this invention, an active hydrogen moiety refers to a moiety containing a hydrogen atom which, because of its position in the molecule, displays significant activity according to the Zerewitnoff test described by Woller in the *Journal of the American Chemical Society*, Vol. 49, page 3181 (1927). Illustrative of such active hydrogen moieties are —COOH, —OH, —NH$_2$, —NH—, —CONH$_2$, —SH and —CONH—. Typical polyahls include polyols, polyamines, polyamides, polymercaptans and polyacids. Of the foregoing polyahls, the polyols are preferred. Examples of representative polyahls which are suitably employed in the practice of this invention are disclosed in U.S. Pat. No. 4,390,645 which is incorporated herein by reference.

Examples of suitable monoahls include monohydric polyethers and monohydric polyesters which are similar in all respects to such polyols as defined hereinbefore except that monofunctional initiators such as monohydric alcohols are used as polymerization initiators instead of the polyfunctional initiators used to initiate polyol polyethers and polyol polyesters. Exemplary monohydric initiators include methanol, ethanol, butanol, and monohydric glycol ethers such as tripropylene glycol methyl ether, as well as phenols, acids, mercaptans, and the like. Others suitable monoahls include monohydroxyl epoxy resins, monohydroxyl polyurethane polymers, monohydroxyl phosphorus compounds, alkylene oxide adducts of monohydric thioesters including polythioethers, monohydric acetals including polyacetals, as well as monomercaptans, N-methylol amides, monoamines, and other compounds which are similar to the aforementioned polyahls except that they contain only one active hydrogen moiety. Of the foregoing monoahls, the monohydric polyethers are preferred.

For the purposes of this invention, the term "active ethylenically unsaturated haloformate" or "haloformate monomer" means a monomer having a haloformate group and an ethylenically unsaturated group capable of undergoing free radical initiated addition polymerization as readily as an α,β-ethylenically unsaturated haloformate, preferably as readily as acryloyl. Representative chloroformates, prepared as described in British Pat. No. 629,019, are the chloroformate esters of α,β-ethylenically unsaturated carboxylic acids, such as acryloxyethylchloroformate and methacryloxyethylchloroformate; 3-propylene chloroformate; and chloroformate substituted styrenes. Vinyl functional bishaloformates can be utilized, but are much less preferred. It is most preferred to employ chloroformates due to considerations such as commercial availability, however, it is understood that haloformates such as, for example fluoroformates and bromofluorates can also be employed.

Much less preferred, but also within the scope of this invention are ethylenically unsaturated haloformylthiolate monomers. These monomers have a haloformylthiolate group represented as, for example,

and an ethylenically unsaturated group capable of undergoing free radical initiated addition polymerization as described hereinbefore. It is understood that such monomers are similar in structure and can be employed in a manner similar to those haloformate monomers described herein.

The adduct of monoahl or polyahl and haloformate or haloformylthiolate monomer is the reaction product resulting from the reaction of an active hydrogen moiety of a monoahl or polyahl with the haloformate or haloformylthiolate moiety of an active ethylenically unsaturated monomer. The adduct is advantageously compatible with the polyahl which is the continuous phase of the copolymer dispersion. By "compatible with" is meant that the adduct is either soluble in or dispersible in the polyahl. Typically, the adduct has a polymer backbone corresponding to the polymer backbone of the monoahl or polyahl and at least one pendant ethylenically unsaturated carbonate group. When the monoahl is a monool or the polyahl is a polyol, the linkage is a carbonate linkage represented by the formula:

When the monoahl is a monoamine or the polyahl is a polyamine, the linkage is a urethane linkage represented by the formula:

The more preferred adducts employed in the present invention are those represented by the formula:

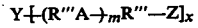

wherein each A is individually —O—, —S— or

wherein $R_1$ is hydrogen or alkyl; preferably A is —O—; Y is hydroxyl, oxyhydrocarbyl, oxycarbonylhydrocarbyl, an α,β-ethylenically unsaturated moiety linked to the remaining portion of said adduct through a carbonate-type linkage, or a residue of an active hydrogen initiator suitably employed in the preparation of a polyether; each Z is individually hydroxyl, oxyhydrocarbyl, oxycarbonylhydrocarbyl or said α,β-ethylenically unsaturated moiety provided that the polyether contains at least one of said α,β-ethylenically unsaturated moiety; each R''' is individually alkylene, hydroxylalkylene, aminoalkylene, alkoxyalkylene, aryloxyalkylene, arylalkylene, hydroxyalkylalkylene, hydroxyarylalkylene, or haloalkylene; m is a whole number such that +R'''A)$_m$—R'''— has a number average molecular weight ($M_n$) from about 100 to about 100,000, especially from about 250 to about 10,000; and x is a whole number from 1 to 10 provided that when Y is other than hydroxyl, x is at least 2. Most preferably, x is 2 or 3. For the purposes of this invention, hydrocarbyl is a monovalent hydrocarbon moiety such as aryl, alkyl, alkenyl and the like. Also, the terminology "each R''' is individually" means that the R''' groups in a particular polymer molecule may be the same or different. A corresponding interpretation applies to the terminologies "each Z is individually" and "each A is individually."

The most preferred adducts have polyalkyleneoxy backbones bearing at least one pendant ethylenically unsaturated carbonate group represented by the formula:

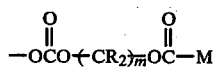

wherein each R is individually hydrogen, alkyl or a comparable inert substituent; M is an ethylenically unsaturated moiety such as

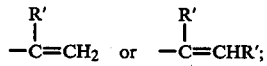

each R' is individually hydrogen, lower alkyl of, for example, about one to about four carbon atoms or

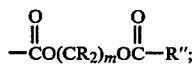

with R" being an inert group such as alkoxy or polyalkyleneoxy; and m is a whole number preferably 1 to 6, more preferably 2 to 4, and most preferably 2.

Alternatively, portions of other adducts can be represented by the formulas:

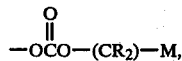

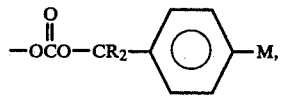

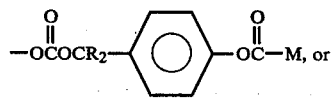

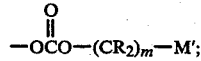

wherein M, R and m are as previously defined, and M' is an acetylenic moiety such as

wherein R' is as previously defined.

The adduct of haloformate or haloformylthiolate monomer and monoahl or polyahl (hereinafter called "mono-adduct") is most advantageously prepared by reacting an active ethylenically unsaturated haloformate or haloformylthiolate with a monoahl or polyahl under conditions sufficient to cause the haloformate or haloformylthiolate portion of the monomer to react with an active hydrogen group of the monoahl or polyahl to form a carbonate-type linkage. That is, the method for preparing the copolymer dispersions of this invention comprises reacting an active haloformate or haloformylthiolate monomer with a monoahl or polyahl to form a monomeric adduct and copolymerizing the adduct with another ethylenically unsaturated monomer or a mixture of at least two of such other monomers in a polyahl liquid medium, which medium is a continuous phase.

Advantageously, when the monoahl is a monool or the polyahl is a polyol the reaction is carried out in the presence of a base such as triethylamine, pyridine or N,N-dimethylaniline. It is preferred that equivalent amounts of haloformate or haloformylthiolate moiety and base be employed. The conditions employed in carrying out the ester reaction involve maintaining the reaction mixture of the monoahl or polyahl and monomer either neat, or alternatively dissolved in a non-reactive solvent such as methlene chloride, ethyl acetate, toluene or diethyl ether at a temperature from ambient to reflux in a vessel for a reaction time from a few seconds to about 24 hours. Also suitably employed are reactive solvents such as polyahl or other ethylenically unsaturated monomers. The equivalent ratio of haloformate or haloformylthiolate monomer to active hydrogen of the polyahl is preferably less than about 1:1 in order that gelation not occur. In the more preferred embodiments, very low haloformate or haloformylthiolate to active equivalent hydrogen ratios are employed, e.g., less than about 0.2:1, preferably in the range from about 0.2:1 to about 0.001:1, most preferably in the range from about 0.1:1 to about 0.001:1. It is understood that in the case of a monoahl, the haloformate or haloformylthiolate to active equivalent hydrogen ratio can be significantly higher than th case of the polyahl. If a solvent has been used in the reaction, it can be removed, or the composition containing the solvent can be employed as is. Also, the mono-adduct can be blended with additional polyahl.

Another method of preparing the copolymer dispersions of this invention comprises copolymerizing an active haloformate or halformylthiolate monomer with another ethylenically unsaturated monomer or a mixture of at least two of such other monomers and reacting the resulting copolymer with a monoahl or polyahl in excess polyahl to form a polymeric adduct of monoahl or polyahl and copolymer dispersed in polyahl. The adduct of (1) addition copolymer of haloformate or haloformylthiolate monomer with at least one other ethylenically unsaturated monomer and (2) a monoahl or a polyahl (hereinafter called "poly-adduct") is beneficially prepared by first copolymerizing the haloformate or haloformylthiolate monomer with other monomer(s) by polymerization techniques described hereinafter and then reacting the copolymer with a monoahl or a polyahl using the procedures and conditions described hereinbefore to react the haloformate or haloformylthiolate monomer with the monoahl or polyahl.

The mixture of poly-adduct and copolymerizate of mono-adduct and other monomer(s) is readily prepared by physically mixing the components neat or dispersed in polyahl. Alternatively, this mixture can be prepared by subjecting a mixture of monoahl or polyahl, haloformate or haloformylthiolate monomer and other monomer(s) to conditions sufficient to cause copolymerization and isocyanate/polyahl reaction. The polyahl dispersion containing a mixture of the poly-adduct and/or the copolymerizate with a polymer(s) of other monomer(s) is advantageously made by forming a dispersion of poly-adduct and/or copolymerizate in polyahl by one of the foregoing methods and then adding other monomer(s) and subjecting the resulting formulation to polymerization conditions. It is found that the poly-adduct and/or copolymerizate stabilize the resulting dispersion of polymer much in the same manner as described in U.S. Pat. No. 4,148,840.

Suitable ethylenically unsaturated monomers (so-called other monomers or other ethylenically unsaturated monomers), which are copolymerized to form copolymers with the monomeric adduct and/or the reactive monomer, include aliphatic conjugated dienes such as butadiene and isoprene; monovinylidene aromatic monomers such as styrene, α-methyl styrene, ar-methyl styrene, ar-(t-butyl)styrene, ar-chlorostyrene, ar-cyanostyrene and ar-bromostyrene; α,β-ethylenically unsaturated carboxylic acids and esters thereof such as acrylic acid, methacrylic acid, methyl methacrylate, ethyl acrylate, 2-hydroxyethyl acrylate, butyl acrylate, itaconic acid, maleic anhydride and the like; α,β-ethylenically unsaturated nitriles and amides such as acrylonitrile, methacrylonitrile, acrylamide, methacrylamide, N,N-dimethyl acrylamide, N-(dimethylaminomethyl) acrylamide, and the like; vinyl esters such as vinyl acetate; vinyl ethers; vinyl ketones; vinyl and vinylidene halides as well as a wide variety of other ethylenically unsaturated materials which are copolymerizable with the aforementioned monomeric adduct or reactive monomer, many of which have heretofore been employed in the formation of copolymer polyols as described in U.S. Pat. Nos. 3,823,201 and 3,383,351. It is understood that mixtures of two or more of the aforementioned monomers are also suitably employed in making the copolymer. Of the foregoing monomers, the monovinylidene aromatic monomers, particularly styrene, and the ethylenically unsaturated nitriles, particularly acrylonitrile, are especially preferred.

The amount of other ethylenically unsaturated monomer(s) employed in the copolymerization reaction is generally an amount sufficient to provide good reinforcement in polyurethane polymers and cell opening in polyurethane foams. Preferably, the amount of other unsaturated monomer(s) is from about 1 to about 70, more preferably from about 5 to about 50, most preferably from about 10 to about 40, weight percent based on the weight of the copolymer dispersion. The amount of the mono-adduct employed in the copolymerization reaction is an amount sufficient to produce a stable dispersion and provide particle size control. Preferably, the amount of the mono-monomeric adduct employed comprises from about 0.01 to about 50, more preferably from about 0.05 to about 25, most preferably from about 0.1 to about 15, weight percent based on the weight of the copolymer dispersion.

The copolymerization is readily carried out by simultaneously adding at a steady or constant rate monomer(s) and a free radical catalyst to the unsaturated monoahl or unsaturated polyahl or a mixture of the unsaturated monoahl or polyahl and the polyahl under conditions sufficient to cause free radical addition polymerization. The temperature of the copolymerization is dependent upon the initiator and is preferably in the range from about 25° to about 190° C., most preferably from about 110° to about 130° C., when azo-type catalysts are used. Alternatively, the free radical catalyst may be dispersed in a portion of the polyahl and thereafter added along with monomer to the unsaturated monoahl or unsaturated polyahl. Other polymerization processes, both continuous and batch, may be suitably employed.

Suitably, the concentration of polymerization catalyst is any amount sufficient to cause copolymerization of the monomeric adduct and the ethylenically unsaturated monomer(s). Preferably, however, the concentration of catalyst is in the range from about 0.1 to about 20, more preferably from about 0.5 to about 5, weight percent based on the weight of the other monomer(s).

Catalysts suitably employed in the practice of the copolymerization are free radical type polymerization catalysts such as the peroxides, persulfates, perborates, percarbonates, azo compounds and the like. Examples of such catalysts include hydrogen peroxide, di(t-butyl)-peroxide, t-butyl peroctoate, lauroyl peroxide, cumene hydroperoxide, t-butyl hydroperoxide, azobis-(isobutyronitrile) as well as mixtures of such catalysts. Of the foregoing catalysts, azobis(isobutyronitrile) and peroxy esters such as t-butyl peroctoate and t-butyl perbenzoate are preferred.

In addition to the foregoing catalysts, chain transfer agents such as mercaptans, e.g., dodecanethiol, and carbon tetrahalides such as carbon tetrachloride may be employed in conventional amounts to control molecular weight of the copolymerizate.

An especially preferred dispersion is one wherein the polyahl is a polyether polyol, the monoahl is a polyether monool, the reaction haloformate monomer is methacryloxyethylchloroformate or acryloxyethylchloroformate, and the other ethylenically unsaturated monomer or a mixture of at least two of such other monomers is a monovinylidene aromatic, an ethylenically unsaturated carboxylic acid, an ethylenically unsaturated nitrile, an alkyl ester of an ethylenically unsaturated carboxylic acid, a vinyl halide, a vinylidene halide or a mixture of two or more thereof.

The resulting copolymer dispersion is readily reacted with an organic polyisocyanate to form desired polyurethane products using conventional polyurethane reaction conditions and procedures. Such reaction and procedures are optionally carried out in the presence of additional polyahls, chain extending agents, catalysts, surface active agents, stabilizers, blowing agents, fillers and pigments. In the preparation of foamed polyurethane, suitable procedures for the preparation of same are disclosed in U.S. Pat. No. Re. 24,514, which is incorporated herein by reference. When water is added as the blowing agent, corresponding quantities of excess isocyanate to react with the water and produce carbon dioxide may be used. It is also possible to proceed wih the preparation of the polyurethane plastics by a prepolymer technique wherein an excess of organic polyisocyanate is reacted in a first step with the graft copolymer dispersion of the present invention to prepare a prepolymer having free isocyanate groups which is then reacted in a second step with water to prepare a foam. Alternatively, the components may be reacted in a single working step commonly known as the "one-shot" technique of preparing polyurethanes. Furthermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoroethane, vinylidene chloride and methylene chloride may be used as blowing agents.

The foams may also be prepared by the froth technique as described in U.S. Pat. Nos. 3,755,212; 3,849,156 and 3,821,130 which are also incorporated herein by reference.

Organic polyisocyanates which may be employed include aromatic, aliphatic and cycloaliphatic polyisocyanates and combinations thereof. Representative of these types are the diisocyanates such as m-phenylene diisocyanate, tolylene-2,4-diisocyanate, tolylene-2,6-diisocyanate, hexamethylene-1,6-diisocyanate, tetramethylene-1,4-diisocyanate, cyclohexane-1,4-diisocyanate, hexahydrotolylene diisocyanate (and isomers), naphthylene-1,5-diisocyanate, 1-methoxyphenyl-2,4-diisocyanate, diphenylmethane-4,4-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate; the triisocyanates such as 4,4',4'-triphenylmethane triisocyanate, polymethylene polyphenylisocyanate and tolylene-2,4,6-triisocyanate; and the tetraisocyanates such as 4,4'-dimethyldiphenylmethane-2,2',5,5'-tetraisocyanate. Especially useful due to their availability and properties are tolylene diisocyanate, diphenylmethane-4,4'-diisocyanate and polymethylene polyphenylisocyanate.

Crude polyisocyanate may also be used in the practice of the present invention, such as crude toluene diisocyanate obtained by the phosgenation of a mixture of toluene diamines or crude diphenylmethylene diisocyanate obtained by the phosgenation of crude diphenylmethylenediamine. The preferred undistilled or crude isocyanates are disclosed in U.S. Pat. No. 3,215,652.

The copolymer dispersions of this invention are preferably employed in combination with other polyahl(s) commonly employed in the art. Accordingly, any of the polyahls which are described above for use in the preparation of the polymer dispersions of the present invention may be employed.

Chain-extending agents which may be employed in the preparation of the polyurethane compositions of the present invention include those compounds having at least two functional groups bearing active hydrogen atoms such as water, hydrazine, primary and secondary diamines, amino alcohols, amino acids, hydroxy acids, glycols or mixtures thereof. A preferred group of chain-extending agents includes water and primary and secondary aromatic diamines which react more readily with the isocyanate than does water such as phenylenediamine, bis(3-chloro-4-aminophenyl)methane, 2,4-diamino-3,5-diethyl toluene, trisecondary butanolamine, isopropanolamine, diisopropanolamine, N-(2-hydroxypropy)ethylenediamine, and N,N'-di(2-hydroxypropyl)ethylenediamine.

The urethane reaction of polyisocyanate with the compolymer dispersion is advantageously carried out in the presence of an amount of urethane-type catalyst which is effective to catalyze reaction of the polyahl of the copolymer dispersion with the polyisocyanate. Preferably, the amount of urethane catalyst is an amount comparable to that used in conventional urethane-type reactions.

Any suitable urethane catalyst may be used including tertiary amines, such as for example, triethylenediamine, N-methyl morpholine, N-ethyl morpholine, diethyl ethanolamine, N-coco morpholine, 1-methyl-4-dimethylaminoethyl piperazine, 3-methoxy-N-dimethylpropyl amine, N,N-dimethyl-N',N'-methyl isopropyl propylenediamine, N,N-diethyl-3-diethylaminopropyl amine, dimethyl benzyl amine and the like. Other suitable catalysts are, for example, tin compounds such as stannous chloride, tin salts of carboxylic acids such as dibutyltin di-2-ethyl hexoate, as well as other organometallic compounds such as are disclosed in U.S. Pat. No. 2,846,408.

A wetting agent(s) or surface-active agent(s) is generally necessary for production of high grade polyurethane foam according to the present invention, since in the absence of same, the foams collapse or contain very large uneven cells. Numerous wetting agents have been found satisfactory. Nonionic surfactants and wetting agents are preferred. Of these, the nonionic surface-active agents prepared by the sequential addition of propylene oxide and then ethylene oxide to propylene glycol and the solid or liquid organosilicones have been found particularly desirable. Other surface-active agents which are operative, although not preferred, include polyethylene glycol ethers of long chain alcohols, tertiary amine or alkylolamine salts of long chain alkyl acid sulfate esters, alkyl sulfonic esters and alkyl arylsulfonic acids.

The following examples are given to illustrate the present invention and are not to be construed as limiting the scope thereof in any manner. All parts and percentages are by weight unless otherwise indicated.

EXAMPLE 1

The mono-adduct is prepared as follows. Into a 1-liter, 3-neck, round-bottom flask equipped with stirrer, condenser, thermocouple, pressure equilizing addition funnel and under a blanket of nitrogen is charged 400 ml of dichloromethane, 5.45 g (0.069 mole) of pyridine, 200 g (0.069 mole) of a butanol initiated polyalkylene glycol monool made from propylene oxide and butanol, and 0.1 g of monomethylether hydroquinone (MEHQ). The solution is stirred and heated to reflux at which time 12.3 g (0.069 mole) of acryloxyethylchloroformate diluted in 50 g of dichloromethane is added to the flask over a half hour period after which refluxing is continued for an additional hour. The methylene chloride is then removed by distillation, the residual product is cooled to room temperature and 400 ml of anhydrous ether is added causing further precipitation of pyridine hydrochloride. The resulting salt precipitate is removed by filtration and the ether is removed by vacuum distillation to produce a clear, water-white fluid.

For purposes of comparison, the foregoing procedure is followed except that triethylamine is used as a base. The reaction proceeds as described above, except that salt removal is more difficult.

EXAMPLE 2

Polystryrene dispersions in polyether polyol are prepared as follows. Into a standard apparatus described in Example 1 is added 0.1 g of MEHQ, 200 g of the monool of Example 1, 5.46 g of pyridine and 400 ml of dichloromethane. To this is stirred and refluxed a solution of 13.3 g (0.069 mole) of methacryloxyethyl chloroformate diluted in 50 ml of dichloromethane over a half hour period. After further reflux for one hour and treatment as in Example 1, a water-white fluid of methacryloyl polyol (herein called Methacryloyl Polyol I) is obtained. Into a 1-liter, 3-neck flask, as described previously, is fed 51.1 g (0.017 mole) of Methacryloyl Polyol I and 536.4 g (0.111 mole) of a glycerine initiated polyalkylene polyol made from propylene oxide and ethylene oxide. The mixture is stirred and heated to 120° C. under a nitrogen blanket. Addition of 5.9 g (0.04 mole) of azobisisobutyronitrile (AZO) dissolved in 146.9 g (1.41 moles) of styrene to the mixture over a 90-minute period gives a milk-white dispersion. The dispersion is heated for an additional hour, then stripped for 2 hours at 120° C. to yield a stable copolymer/polyol dispersion having a Brookfield viscosity (RV viscometer, spindle No. 3, 10 rpm at 25° C.) of 1,650 cps, and a volume mean diameter of 1.1 micrometers as measured by hydrodynamic chromatography.

EXAMPLE 3

Under identical conditions as described in Experiment 2 in combined 500.2 g (0.102 mole) of polyol, having a number average molecular weight in the range of about 4000 to about 6000, 136.8 g (1.31 moles) of styrene, 5.5 g of AZO and 47.1 g (0.015 mole) of the product obtained in Example No. 1. Reactants are added, reacted, and stripped as described in Example No. 2. The product is a stable copolymer/polyol dispersion having a Brookfield viscosity (RV viscometer, spindle No. 3, 10 rpm at 25° C.) of 1,340 cps.

What is claimed is:

1. A stable improved copolymer dispersion which comprises:
   (A) a polyahl having dispersed therein;
   (B) an addition copolymerizate of (1) a monomeric adduct of (a) an active ethylenically unsaturated haloformate or haloformylthiolate monomer and (b) a monoahl or a polyahl with (2) at least one other ethylenically unsaturated monomer; or
   (C) (1) an addition copolymer of a haloformate or haloformylthiolate monomer with at least one other ethylenically unsaturated monomer and (2) a monoahl or polyahl; or
   (D) a mixture of (B) and (C); or
   (E) a mixture of (B) and/or (C) and a polymer of at least one other ethylenically unsaturated monomer.

2. A dispersion of claim 1 wherein the mole ratio of polymerized haloformate or haloformylthiolate monomer to monoahl or polyahl is at least about 0.001:1 and less than an amount at which gelation occurs.

3. A dispersion of claim 1 wherein the adduct comprises from about 0.01 to about 50 weight percent of the dispersion.

4. A dispersion of claim 1 wherein the polyahl is a polyether polyol, the monoahl is a polyether monool, the reactive haloformate monomer is methacryloxyethylchloroformate or acryloxyethylchloroformate, and the other ethylenically unsaturated monomer or a mixture of at least two of such other monomers is a monovinylidene aromatic, an ethylenically unsaturated carboxylic acid, an ethylenically unsaturated nitrile, an alkyl ester of an ethylenically unsaturated carboxylic acid, a vinyl halide, a vinylidene halide or a mixture of two or more thereof.

5. A dispersion of claim 1 wherein the mole ratio of polymerized haloformate or haloformylthiolate monomer to monoahl or polyahl is in the range from about 0.001:1 to about 0.0:1.

6. A dispersion of claim 1 wherein the mole ratio of polymerized haloformate or haloformylthiolate monomer to monoahl is in the range from about 0.001:1 to about 0.2:1.

7. A dispersion of clim 1 wherein the other monomer constitutes from about 1 to about 70 weight percent of the dispersion.

8. A dispersion of claim 4 wherein the other monomer or mixture of such other monomers constitutes from about 1 to about 70 weight percent of the dispersion.

9. A dispersion of claim 1 wherein the other monomer constitutes from about 10 to about 40 weight percent of the dispersion.

10. A dispersion of claim 4 wherein the mixture of such monomers constitutes from about 10 to about 40 weight percent of the dispersion.

11. A dispersion of claim 1 wherein the adduct is represented by the formula:

$$Y-[(R'''A)_m R''' -Z]_x$$

wherein each A is individually —O—, —S— or $$-\underset{R_1}{\underset{|}{N}}-$$

wherein $R_1$ is hydrogen or alkyl; Y is hydroxyl, oxyhydrocarbyl, oxycarbonylhydrocarbyl, an $\alpha,\beta$-ethylenically unsaturated moiety linked to the remaining portion of said adduct through a carbonate-type linkage, or a residue of an active hydrogen initiator suitably employed in preparation of a polyether; each Z is individually hydroxyl, oxyhydrocarbyl, oxycarbonylhydrocarbyl or said $\alpha,\beta$-ethylenically unsaturated moiety provided that the polyether contains at least one of said $\alpha,\beta$-ethylenically unsaturated moiety; each ''' is individually alkylene, hydroxylalkylene, aminoalkylene, alkoxyalkylene, aryloxyalkylene, arylalkylene, hydroxyalkylalkylene, hydroxyarylalkylene, or haloalkylene; m is a whole number such that —R'''A)$_m$—R'''— has a number average molecular weight ($M_n$) from about 100 to about 100,000; and x is a whole number from 1 to 10 provided that when Y is other than hydroxyl, x is at least 2.

12. A dispersion of claim 1 which comprises:
   (A) a polyahl having dispersed therein;
   (B) an addition copolymerizate of (1) a monomeric adduct of (a) an active ethylenically unsaturated haloformate monomer and (b) a monoahl or a polyahl with (2) at least one other ethylenically unsaturated monomer; or
   (C) (1) an addition copolymer of a haloformate monomer with at least one other ethylenically unsaturated monomer and (2) a monoahl or polyahl; or
   (D) a mixture of (B) and (C); or
   (E) a mixture of (B) and/or (C) and a polymer of at least one other ethylenically unsaturated monomer.

13. A dispersion of claim 12 wherein the mole ratio of polymerized haloformate monomer to monoahl or polyahl is at least about 0.001:1 and less than an amount at which gelation occurs.

14. A dispersion of claim 12 wherein the haloformate monomer is a chloroformate monomer.

15. A method for making the copolymer dispersion of claim 1 which method comprises:
   (A) reacting an active haloformate or haloformylthiolate monomer with a monoahl or polyahl to form a monomeric adduct and
   (B) copolymerizing the adduct with another ethylenically unsaturated monomer or a mixture of at least two of such other monomers in a polyahl liquid medium which medium is a continuous phase.

16. A method for making the copolymer dispersion of claim 1 which method comprises:
   (A) copolymerizing an active haloformate or haloformylthiolate monomer with another ethylenically unsaturated monomer or a mixture of at least two of such other monomers and
   (B) reacting the resulting copolymer with a monoahl or polyahl in excess polyahl to form a polymeric adduct of monoahl or polyahl and copolymer dispersed in polyahl.

17. A polyurethane composition prepared by reacting the copolymer dispersion of claim 1 with an organic polyisocyanate.

18. A polyurethane composition of claim 17 in the form of a foam.

* * * * *

UNITED STATES PATENT AND TRADEMARK OFFICE
CERTIFICATE OF CORRECTION

PATENT NO. : 4,477,603

DATED : October 16, 1984

INVENTOR(S) : Thomas E. Fisk

It is certified that error appears in the above-identified patent and that said Letters Patent is hereby corrected as shown below:

Col. 2, line 34, "term" should read --terms--.
Col. 3, line 27, "Others" should read --Other--.
Col. 6, line 12, "methlene chloride" should read --methylene chloride--; line 28, "th" should read --the--; line 35, "halformylthiolate" should read --haloformylthiolate--.
Col. 8, line 23, "reaction" should read --reactive--; line 45, "wih" should read --with--.
Col. 9, line 43, please delete the period and insert therefor --,--; line 46, "hydroxypropy)ethylenediamine" should read --hydroxypropyl)ethylenediamine--; line 49, "compolymer" should read --copolymer--.
Col. 10, Example 2, line 48, "Polystryrene" should read --"Polystyrene--.
Col. 11, Example 3, line 8, please delete "in".
Claim 5, line 4, "0.0:1" should read --0.1:1--.
Claim 7, line 1, "clim" should read --claim--.
Claim 11, line 15, "'''" should read --R'''--; line 19, "—R'''A)$_m$—R'''—" should read -- $\text{---}(\text{R'''A})_m\text{---R'''---}$ --.

Signed and Sealed this

Eighth Day of October 1985

[SEAL]

Attest:

Attesting Officer

DONALD J. QUIGG

Commissioner of Patents and Trademarks—Designate